(12) United States Patent
Hibben et al.

(10) Patent No.: US 9,120,936 B2
(45) Date of Patent: Sep. 1, 2015

(54) WATER-BASED COMPOSITIONS THAT RESIST DIRT PICK-UP

(71) Applicant: VALSPAR SOURCING, INC., Minneapolis, MN (US)

(72) Inventors: Mary Jane Hibben, Elburn, IL (US); Michael C. Wildman, Hoffman Estates, IL (US); T. Howard Killilea, North Oaks, MN (US); Iain Harvey, Crystal Lake, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 14/197,752

(22) Filed: Mar. 5, 2014

(65) Prior Publication Data

US 2014/0275315 A1 Sep. 18, 2014

Related U.S. Application Data

(60) Provisional application No. 61/799,995, filed on Mar. 15, 2013.

(51) Int. Cl.
| | | |
|---|---|---|
| C08F 2/46 | (2006.01) | |
| C08F 2/50 | (2006.01) | |
| B29C 71/04 | (2006.01) | |
| A61L 2/08 | (2006.01) | |
| A61L 24/00 | (2006.01) | |
| C08G 61/04 | (2006.01) | |
| C09D 7/12 | (2006.01) | |

(52) U.S. Cl.
CPC .................................... *C09D 7/1233* (2013.01)

(58) Field of Classification Search
CPC ..................................................... C09D 7/1233
USPC ............. 522/46, 33, 6, 1, 71, 189, 184; 520/1
See application file for complete search history.

(56) References Cited

U.S. PATENT DOCUMENTS

| | | | |
|---|---|---|---|
| 3,214,492 A | 10/1965 | Tocker | |
| 3,320,198 A * | 5/1967 | Hill | ................................ 428/511 |
| 3,429,852 A | 2/1969 | Skoultchi | |
| 4,255,308 A | 3/1981 | Brasen | |
| 5,248,805 A | 9/1993 | Boettcher et al. | |
| 5,385,815 A | 1/1995 | Schofield et al. | |
| 5,629,365 A | 5/1997 | Razavi | |
| 5,942,368 A | 8/1999 | Akiyama et al. | |
| 5,990,228 A | 11/1999 | Eichman et al. | |
| 6,258,887 B1 | 7/2001 | Bardman et al. | |
| 6,303,188 B1 | 10/2001 | Bors et al. | |
| 6,376,570 B1 | 4/2002 | Zhao et al. | |
| 6,740,692 B2 * | 5/2004 | Weitzel et al. | ................... 524/48 |
| 6,762,230 B2 | 7/2004 | Brandenburger et al. | |
| 6,930,141 B2 | 8/2005 | Gebhart et al. | |
| 7,101,921 B2 | 9/2006 | Edwards et al. | |
| 7,138,438 B2 | 11/2006 | Lauer et al. | |
| 7,812,079 B2 | 10/2010 | Brandenburger et al. | |
| 8,110,624 B2 | 2/2012 | Brandenburger et al. | |
| 8,440,752 B2 | 5/2013 | Brandenburger et al. | |
| 2005/0032954 A1 | 2/2005 | Brandenburger et al. | |
| 2005/0203211 A1 * | 9/2005 | Gebhard | ........................ 523/205 |
| 2006/0111503 A1 | 5/2006 | Killilea et al. | |
| 2007/0110981 A1 | 5/2007 | Killilea et al. | |
| 2007/0248837 A1 | 10/2007 | Hsu et al. | |
| 2009/0326121 A1 | 12/2009 | Stockl et al. | |
| 2012/0129974 A1 | 5/2012 | DeNotta et al. | |
| 2013/0210985 A1 | 8/2013 | Brandenburger et al. | |

FOREIGN PATENT DOCUMENTS

| | | |
|---|---|---|
| EP | 0010000 A1 | 4/1980 |
| FR | 2786777 A1 | 12/1998 |
| FR | 2786777 * | 6/2000 |
| JP | 4117461 A | 4/1992 |
| WO | 94/00524 A1 | 1/1994 |
| WO | 99/58608 A1 | 11/1999 |
| WO | 00/06643 A1 | 2/2000 |
| WO | 02/068547 A1 | 9/2002 |
| WO | 2006/065914 A1 | 6/2006 |
| WO | 2007/087458 A1 | 8/2007 |
| WO | 2012/028627 A1 | 3/2012 |

OTHER PUBLICATIONS

Gilles, FR 2876777 Machine Translation, Jun. 9, 2000.*
ASTM D2369-90. Standard Test Method for Volatile Content of Coatings. 1990. 5 pages.
ASTM D3960-02. Standard Practice for Determining Volatile Organic Compound (VOC) Content of Paints and Related Coatings. 2002. 8 pages.
ASTM D6886-12. Standard Test Method for Determination of the Individual Volatile Organic Compounds (VOCs) in Air-Dry Coatings by Gas Chromatography. 2012. 7 pages.
"High Lights! Radiation curing with resins and photoinitiators for industrial coatings and graphic arts: Laromer®, Irgacure®, Lucirin®, Darocur®." BASF SE, Lufwigshafen, Germany [retrieved on Aug. 6, 2014]. Retrieved from the Internet:<URL: http://www.basf.com/group/corporate/en_GB/literature-document:/Brand+Darocur-Brochure—High+lights+Radiation+curing+with+resins+and+photoinitiators+for+industrial+coatings+and+graphic+arts+Laromer+Irgacure+Lucirin+Darocur-English.pdf>; 44 pages.
International Search Report (PCT/ISA/210) and Written Opinion (PCT/ISA/237), mailed Jun. 18, 2014, in connection with Patent Application No. PCT/US2014/020719, filed Mar. 5, 2014.

* cited by examiner

*Primary Examiner* — Ling Choi
*Assistant Examiner* — Jessica E Whiteley
(74) *Attorney, Agent, or Firm* — Mueting Raasch & Gebhardt, P.A.

(57) ABSTRACT

Water-based compositions containing a low VOC coalescent, a latex or water-dispersible polymer, and a water-insoluble ultraviolet absorber.

20 Claims, No Drawings

WATER-BASED COMPOSITIONS THAT RESIST DIRT PICK-UP

This patent application claims the benefit of U.S. Provisional Patent Application Ser. No. 61/799,995, filed Mar. 15, 2013, which is incorporated herein by reference in its entirety.

BACKGROUND

Water-based compositions, e.g., coating compositions such as paints, that include latex polymer particles or water-dispersible polymer particles typically also include a coalescent (i.e., coalescing agent or film-forming agent) in addition to pigments and fillers, for example. The coalescent functions as a solvent as well as a plasticizer for the polymer particles (to soften the polymer particles and assist in the formation of a continuous coating or film, for example, after applying it to a surface and allowing it to dry).

Useful coalescents are generally stable in the presence of water, compatible with other ingredients typically used in paint formulations, particularly the polymers particles, such that the stability of the water-based composition is not compromised. They are also typically sufficiently volatile to escape when the applied composition is allowed to dry, but sufficiently nonvolatile to evaporate more slowly than other ingredients (e.g., drying retarders, antifreezes) that delay film formation. However, there is a general desire in the industry to reduce volatile organic emissions, thereby reducing the environmental and health concerns.

Although new and improved coalescents have been developed that provide low VOC compositions, such compositions can still be relatively soft and tacky. From the moment it is applied, as low VOC composition, such as a paint, seal coat, caulk, etc. is exposed to contamination from the atmosphere. This contamination includes dirt and dust which are carried to the surface by rain, airborne moisture droplets, wind currents or direct physical contact with people, animals or other objects. Dirt can he either organic or inorganic. Examples of dirt particles include sand, smoke particles, dust, metallic fibres, carbon black, rust, grease, pollen, human detritus, and fungal spores. Dirt particles attract moisture to the surface of the composition. This moisture provides a suitable environment in which microbial spores may survive and proliferate into colonies, thus further contributing to the unsightly appearance of the surface. Accordingly, water-based compositions can acquire is dirty and unsightly appearance because of the amount of air-borne dirt that clings to them. An effective dirt pick-up resistance technology which is suitable for low VOC compositions, and which does not compromise the required application and performance properties of surface finishes, is a common goal of the paint industry.

SUMMARY

The present disclosure provides water-based compositions, such as coating compositions, containing a low VOC coalescent, a latex polymer or water-dispersible polymer, and a water-insoluble ultraviolet absorber, and methods of making such compositions.

In one method of the present disclosure, a method of preparing a water-based composition is provided wherein the method includes:

providing an aqueous polymer including a latex or water-dispersible polymer in water;

providing an additive package including at least one of a pigment, a thickener, a mildewcide, a biocide, a defoamer, a surfactant, a dispersant, a filler, and combinations thereof;

providing one or more water-insoluble ultraviolet absorbers capable of absorbing UV radiation within a range of 240-400 nm;

providing one or more low VOC coalescents having a volatile organic content of 30% or less;

dissolving the one or more water-insoluble ultraviolet absorbers in the one or more low VOC coalescents to form a UV-absorber-coalescent solution;

mixing the aqueous polymer with the additive package; and before and/or after mixing the aqueous polymer with the additive package, the UV-absorber-coalescent solution is mixed with the aqueous polymer, the additive package, or both to form a water-based coating.

In another embodiment, a method of preparing a water-based composition is provided that includes:

providing an aqueous polymer including a latex polymer in water;

providing an additive package including at least one of a pigment, a thickener, a mildewcide, a biocide, a defoamer, a surfactant, a dispersant, a filler, and combinations thereof;

providing one or more water-insoluble ultraviolet absorbers capable of absorbing UV radiation within a range of 240-400 nm;

providing one or more low VOC coalescents having a volatile organic content of 30% or less;

dissolving the one or more water-insoluble ultraviolet absorbers in the one or more low VOC coalescents to form a UV-absorber-coalescent solution;

mixing the UV-absorber-coalescent solution with the aqueous polymer; and subsequently mixing the aqueous polymer, having the UV-absorber-coalescent therein, with the additive package.

The present disclosure also provides a water-based composition prepared by a method as described herein.

DEFINITIONS

The term "latex" means a dispersion of polymer particles in water; a latex polymer typically requires a secondary dispersing agent (e.g., a surfactant) for creating a dispersion or emulsion of polymer particles in water having at least a one-month shelf stability at normal storage temperatures.

The term "water-dispersible" in the context of the polymer means one that is itself capable of being dispersed into water for creating a dispersion or emulsion of polymer particles in water having at least a one-month shelf stability at normal storage temperatures.

The term "dispersible" in the context of a dispersible coalescent means that the coalescent can be mixed into the water-based composition of latex or water-dispersible polymer particles to form a uniform mixture without the use of high shear mixing.

The term "stable" in the context of a water-based composition containing a dispersible coalescent means that the coalescent does not phase separate from the water-based composition upon standing at 120° F. (49° C.) for at least four weeks.

The terms "volatile organic content" and "VOC" in the context of the coalescent herein mean the volatility of the coalescent as measured by ASTM method D2369-90. Typically, this involves weighing out approximately 0.5 gram (g) of coalescent into an aluminum weighing dish and placing it in a forced air oven at 110° C. for 1 hour. The dish is then reweighed and the mass lost represents the percent (%) VOC of the coalescent.

The terms "volatile organic content" and "VOC" in the context of the composition mean the volatility of the composition as measured by ASTM D3960-02. Typically this involves using the following calculation: [(weight percent of total volatiles less water less exempt volatile compounds)*(density of paint)/100%−(volume percent of water)]−(volume percent of exempt volatile compounds). In this context, "exempt" from VOC include compounds such as acetone and t-butyl acetate.

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

Substitution is anticipated on the organic groups of the coalescents used in the compositions of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably. Thus, for example, a composition that comprises "a" coalescent can be interpreted to mean that the composition includes "one or more" coalescents.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, the statement "up to" a number (e.g., "up to 50") includes that number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present disclosure provides water-based compositions, such as coating compositions, particularly paints, containing a low VOC coalescent, a latex or a water-dispersible polymer, and a water-insoluble ultraviolet absorber. Preferably, the water-based compositions are in the form of paints, although sealers, caulks, and sealants are within the scope of the present disclosure.

The water-based compositions of the present disclosure are advantageous in that they have a relatively low volatile organic content without sacrificing the balance of properties desired for an applied (i.e., dry) composition, such as a coating of paint. Governments have established regulations setting forth guidelines relating to volatile organic compounds (VOC) that may be released into the atmosphere. Such regulations vary from region to region, but the most stringent regulations are in the south coast region (e.g., Los Angeles County and Orange County, Calif.). Such regulations also vary by product. For example, clear topcoats can have no more than 200 grams per liter (g/l), water-borne coatings can have no more than 50 g/l, pigmented lacquers can have no more than 275 g/l VOC.

Reducing the volatility of coalescents, solvents, plasticizers, etc. can adversely affect the balance of properties needed in water-based compositions, especially with respect to dirt pick-up. Thus, there is a need for compositions that possess desirable stability, compatibility, film formation ability, low dirt pick-up, etc.

Compositions of the present disclosure possess these properties while possessing low total VOC in the water-based compositions. In certain embodiments, the water-based compositions include no greater than 25 grams per 100 grams polymer solids, or no greater than 20 grams per 100 grams polymer solids, or no greater than 15 grams per 100 grams polymer solids, or no greater than 10 grams per 100 grams polymer solids, or no greater than 5 grams per 100 grams polymer solids, or no greater than 2 grams per 100 grams polymer solids.

Stated another way, in certain embodiments wherein the water-based compositions of the present disclosure are paints, they include no greater than 25 grams per liter of paint, or no greater than 20 grams per liter of paint, or no greater than 15 grams per liter of paint, or no greater than 10 grams per liter of paint.

Ultraviolet Absorbers (Photoinitiators)

Suitable ultraviolet absorbers are water-insoluble ultraviolet absorbers. By this it is meant that the compounds will not dissolve to an appreciable extent in water at the temperatures typically used for preparing water-based compositions as described herein.

Suitable ultraviolet absorbers are capable of absorbing UV radiation within a range of 240-400 nm. For certain embodiments, they are capable of absorbing UV radiation in the 280-400 nm range, and for certain embodiments in the 315-375 nm range.

Herein, the ultraviolet absorbers do not form a bond to the polymer, although they are capable of generating a radical through a hydrogen-abstraction mechanism by absorbing UV radiation. Although not wishing to be bound by theory, it may be that this results in surface crosslinking of the polymer. Examples of suitable ultraviolet absorbers include the following:

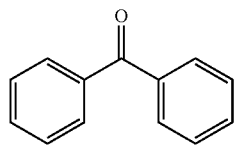 [SMILES: O=C(c1ccccc1)c1ccccc1]

Benzophenone, available from Lamberti, Gallaratte, Italy;

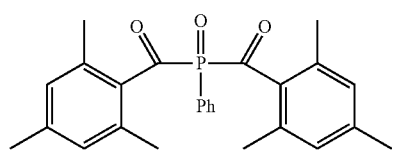

Phenylbis(2,4,6-trimethylbenzoyl)phosphine oxide, available under the trade name IRGACURE 819DW from BASF, Florham Park, N.J.;

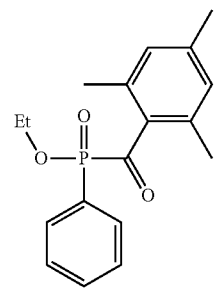 [SMILES: CCOP(=O)(C(=O)c1c(C)cc(C)cc1C)c1ccccc1]

Ethyl-2,4,6-trimethylbenzoylphenylphosphinate, available under the trade name LUCIRIN TPO-L (formerly: LUCIRIN LR 8893) from BASF, Florham Park, N.J.;

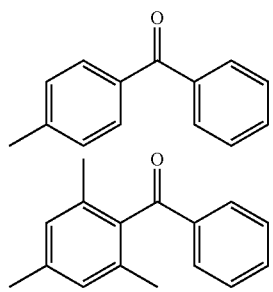

2,4,6-trimethylbenzophenone & 4-methylbenzophenone, available as a mixture under the trade name ESACURE TZT from Lamberti, Gallaratte, Italy;

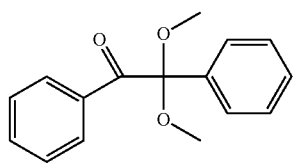 [SMILES: COC(OC)(C(=O)c1ccccc1)c1ccccc1]

2,2-Dimethoxy-1,2-diphenylethanone (i.e., Benzildimethylketal), available under the trade name ESACURE KB 1 from Lamberti;

1-Hydroxycyclohexyl phenyl ketone (i.e., a-hydroxycyclohexylphenylketone), available under the trade name ESACURE KS 300 from Lamberti;

2-Hydroxy-2-methyl-1-phenyl-1-propanone, available under the trade name ESACURE KL 200 from Lamberti;
Polymeric Benzophenone, available under the trade name EBECRYL P39 from Cytec, Woodland Park, N.J.;

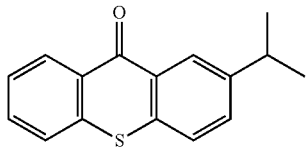 [SMILES: CC(C)c1ccc2sc3ccccc3c(=O)c2c1]

Isopropylthioxanthone, available under the trade name GENOCURE ITX from Rahn USA, Aurora, Ill.;

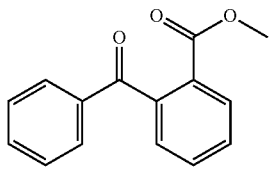 [SMILES: COC(=O)c1ccccc1C(=O)c1ccccc1]

Methyl-o-benzoyl-benzoate, available under the trade name GENOCURE MBB from Rahn;

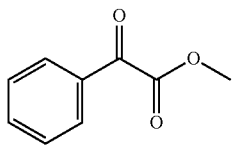

Methylbenzoylformate, available under the trade name GENOCURE MBF from Rahn;

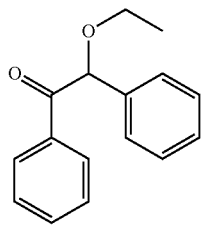 [SMILES: CCOC(C(=O)c1ccccc1)c1ccccc1]

Benzoin ethyl ether, available from Aldrich. St. Louis, Mo.;

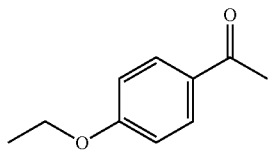

4'-Ethoxyacetophenone, from Aldrich. St. Louis, Mo.;
and combinations thereof.

The amount of the ultraviolet absorbers present in the water-based compositions of the present disclosure includes an amount that provides the desired result. In certain embodiments, the water-based composition of the present disclosure includes a sufficient amount of the one or more water-insoluble ultraviolet absorbers to improve dirt pick-up resistance by at least 10%, or at least 20%, or at least 30%, or at least 40%, or at least 50%, relative to the same water-based composition without the ultraviolet absorber, based on a change in $\Delta E$ values.

A coating discolors when it picks up dirt. $\Delta E$ is measured by a spectrophotometer by comparing the paint that is exposed to dirt and the paint that is "clean" of dirt. The difference is expressed as $\Delta E$. The difference in $\Delta E$'s from the "control" paint and the "experimental" paint can then be calculated. The improvement in dirt pick-up resistance can be expressed as a percentage by taking the difference in $\Delta E$ divided by the $\Delta E$ of the "control" paint.

In certain embodiments, the water-based compositions of the present disclosure include at least 0.1 wt-% of one or more ultraviolet absorbers, based on the weight of the polymer solids. In certain embodiments, the water-based compositions of the present disclosure include up to 5.0 wt-% of one or more ultraviolet absorbers, based on the weight of the polymer solids.

Coalescents

Preferably, the coating compositions include one or more compounds having a relatively low volatile organic content (VOC), and more preferably, a relatively low molecular weight. Typically, the volatile organic content, as determined by ASTM method D2369-90, is 50% or less, 30% or less, 20% or less, 15% or less, 11% or less, or 10% or less, based on the original weight of the coalesent. Preferably, the number average molecular weights of such compounds are 750 or less, and more preferably, 500 or less.

Such compounds are preferably good coalescents. That is, they advantageously provide good film forming properties for the latex or water-dispersible polymer particles.

In certain embodiments, suitable low VOC coalescents assist in the formation of a continuous coating or film from the latex or water-dispersible particles after applying a coating composition containing such particles (e.g., a paint) to a surface and allowing it to dry (preferably, while not reacting with the polymer particles) at room temperature for at least 7 days.

In certain embodiments, a particularly desirable group of low VOC coalescents are those that provide good film forming properties at low temperatures (e.g., below room temperature). Preferably, such compounds facilitate the formation of polymer films of the polymer particles at a temperature of less than 25° C. (more preferably, at a temperature of 4° C. to 10° C., and most preferably, at a temperature of 4° C. to 5° C.).

Suitable coalescents are dispersible in the water-based compositions, which are preferably stable over time. By this it is meant, the coalescent does not phase separate from the water-based composition upon standing at 49° C. for four weeks.

In certain embodiments, suitable low VOC coalescents are compatible with the polymer and other components in the system. That is, they are nonreactive in the composition. In certain embodiments, they are not crosslinkers of the polymer or otherwise reactive with the polymer.

The low VOC coalescents can optionally also function as plasticizers and/or solvents. In particular, suitable low VOC coalescents are those that can function as solvents for the ultraviolet absorbers.

In certain embodiments, the concentration of the ultraviolet absorber in the coalescent is at least 5 percent by weight (wt-%), or at least 10 wt-%, or at least 20 wt-%, or at least 25 wt-%, based on total weight of the solution. In certain embodiments, the concentration of the ultraviolet absorber in the coalescent is up to 30 wt-%, or up to 40 wt-%, or up to 50 wt-%, based on the total weight of the solution. In certain embodiments, the UV-absorber-coalescent solutions include 25-30 wt-% of one or more UV absorbers. Typically, an amount of less than 5 wt-% does not deliver enough absorber to the final water-based composition for effective improvement in dirt pick-up resistance.

In certain embodiments, such low VOC coalescents are of the formula:

$$R^1-(C(O)-X_r-O)_n-R^2$$

wherein: n is 1 to 10; $R^1$ is an organic group, preferably, having less than 100 carbon atoms, and more preferably, having 3 to 24 carbon atoms; $R^2$ is hydrogen or an organic group, preferably, having less than 100 carbon atoms; and X is a divalent organic group, preferably, having 2 to 8 carbon atoms, and more preferably, 3 to 5 carbon atoms; and r is 0 to 1. Preferably, n is 1 to 5, more preferably, n is 1 to 3, and most preferably, n is 2 to 3.

Preferably, $R^1$ is a hydrocarbyl moiety, although for certain preferred embodiments $R^1$ is an organic group that includes substituents selected from the group of nonperoxidic oxygen atoms, carbonyl groups, hydroxyl groups, and combinations thereof, more preferably, substituents selected from the group of nonperoxidic oxygen atoms, hydroxyl groups, and combinations thereof, and most preferably, nonperoxidic oxygen atoms. For certain embodiments, $R^1$ has the formula $R^3-(CH_2)_m-(O(CH_2)_p)_q-$ wherein $R^3$ is an alkyl or aryl group, m is 0 to 24, p is 1 to 4 (preferably, p is 1 to 2), and q is 0 to 50. In this preferred formulation for $R^1$, m+pq is preferably less than 23.

Preferably, X is a divalent hydrocarbyl moiety, although for certain preferred embodiments, X is an organic group that includes substituents selected from the group of nonperoxidic oxygen atoms, carbonyl groups, and combinations thereof, and more preferably, nonperoxidic oxygen atoms and carbonyl groups. For certain embodiments, X has the formula $-(CH_2)_s-$ wherein s is 2 to 8, and preferably, s is 3 to 5.

For certain embodiments, X includes unsaturation. Preferably, X includes at least one carbon-carbon double bond. A preferred example of such a compound is bis(2-ethylhexyl) maleate (i.e., dioctyl maleate), which is available from commercial sources such as Aldrich Chemical Co., Milwaukee, Wis.

Preferably, $R^2$ is hydrogen, although for certain preferred embodiments $R^2$ is $R^1$ as defined above. For certain embodiments, r is one, preferably when $R^2$ is hydrogen.

For certain embodiments, $R^1$ includes at least three carbon atoms when X is not $-(CH_2)_s-$ wherein s is 2 to 8; and $R^1$ and $R^2$ together include less than two aliphatic unsaturated carbon-carbon bonds when r is zero, preferably, $R^1$ and $R^2$ together do not include any aliphatic unsaturated carbon-carbon bonds when r is zero, and more preferably, $R^1$ and $R^2$ together do not include any aliphatic unsaturated carbon-carbon bonds.

For certain embodiments, $R^1$ is an organic group having 3 to 24 carbon atoms and substituents selected from the group of oxygen atoms, carbonyl groups, hydroxyl groups, and combinations thereof; and $R^2$ is hydrogen.

A preferred group of such compounds have the formula:

$$R^1-(C(O)-X_r-O)_n-R^2$$

wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not $-(CH_2)_s-$ wherein s is 2 to 8; with the proviso that the coalescent has less than two aliphatic unsaturated carbon-carbon bonds when r is zero. Such compounds can be made from caprolactone and an alcohol, for example.

Another preferred group of such compounds have the formula:

$$R^1-(C(O)-X_r-O)_n-R^2$$

wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not $-(CH_2)_s-$ wherein s is 2 to 8; with the proviso that the coalescent does not include aliphatic unsaturated carbon-carbon bonds; with the proviso that r is one when $R^2$ is hydrogen.

Another preferred group of such compounds have the formula:

$$R^1-(C(O)-X_r-O)_n-R^2$$

wherein: $R^1$ has the formula $R^3-(CH_2)_m-(O(CH_2)_p)_q-$ wherein $R^3$ is an alkyl or aryl group, m is 0 to 24, p is 1 to 4, and q is 0 to 50; X has the formula $-(CH_2)_s-$, wherein s is 2 to 8; r is 0 to 1; n is 1 to 10; and $R^2$ is hydrogen or Another preferred group of such compounds have the formula:

$$R^1-(C(O)-X-O)_n-H$$

wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10. Such compounds can be made from a glycidyl ester of neodecanoic acid (e.g., CARDURA E10) and a carboxylic acid, for example.

Another preferred group of such compounds have the formula:

$$R^1-(C(O)-X-O)_n-H$$

wherein: $R^1$ is a hydrocarbyl moiety or an organic group containing substituents selected from the group of nonperoxidic oxygen atoms, hydroxyl groups, and combinations thereof; X has the formula $-(CH_2)_s-$, wherein s is 2 to 8; and n is 1 to 10.

Another preferred group of such compounds have the formula:

$$R^1-(C(O)-X-O)_n-H$$

wherein: $R^1$ is a hydrocarbyl moiety or an organic group containing nonperoxidic oxygens; X is an organic group containing nonperoxidic oxygens and carbonyl groups; and n is 1 to 10.

In certain embodiments, a coalescent has the formula:

$$R^1-(C(O)-X_r-O)_n-R^2$$

wherein: $R^1$ is an organic group having at least 3 and less than 100 carbon atoms: X is a divalent organic group; r is 0 or 1; n is 1 to 10; and $R^2$ is hydrogen or an organic group having at least 3 and less than 100 carbon atoms.

In certain embodiments, a coalescent has the formula:

$$R^1-(C(O)-X_r-O)_n-R^2$$

wherein: $R^1$ is an organic group having at least 3 and less than 100 carbon atoms, wherein the organic group is an aliphatic group, alicyclic group, heterocyclic group, or combinations thereof; X is a divalent organic group; r is 1; n is 1; and $R^2$ is hydrogen or an organic group having at least 3 and less than 100 carbon atoms; with the proviso that $R^1$ and $R^2$ together do not include any aliphatic unsaturated carbon-carbon bonds.

In certain embodiments, a coalescent has the formula:

$$R^1-(C(O)-O)-R^2$$

wherein: $R^1$ is an aromatic group having 3 to 24 carbon atoms; and $R^2$ is a hydrocarbyl moiety having 3 to 24 carbon atoms; with the proviso that $R^1$ and $R^2$ together do not include any aliphatic unsaturated carbon-carbon bonds.

In certain embodiments, a coalescent has the formula:

$$R^1\text{—}(C(O)\text{—}O)R^2$$

wherein: $R^1$ is an organic group having at least 3 and less than 100 carbon atoms, wherein the organic group is an aliphatic group, alicyclic group, heterocyclic group, or combinations thereof; $R^2$ is an organic group having less than 100 carbon atoms, wherein the organic group includes a hydroxyl group; and the coalescent has 1 to 2 aliphatic unsaturated carbon-carbon bonds.

In certain embodiments, a coalescent has the formula:

$$R^1\text{—}(C(O)\text{—}X\text{—}O)_n\text{—}H$$

wherein: $R^1$ is an organic group having at least 3 and less than 100 carbon atoms, wherein the organic group is an aliphatic group, alicyclic group, heterocyclic group, or combinations thereof; X is a divalent organic group including an oxygen atom; and n is 1 to 10; and the coalescent has 1 to 2 aliphatic unsaturated carbon-carbon bonds.

In certain embodiments, a coalescent has the formula:

$$R^1\text{—}(C(O)\text{—}X\text{—}O)_n\text{—}R^2$$

wherein: $R^1$ is an organic group having at least 3 and less than 100 carbon atoms, wherein the organic group is an aliphatic group, alicyclic group, heterocyclic group, or combinations thereof; X is a divalent organic group; n is 1 to 10; $R^2$ is an organic group having less than 100 carbon atoms; the coalescent has one aliphatic unsaturated carbon-carbon bond, with the proviso that $R^1$ and $R^2$ together do not include any aliphatic unsaturated carbon-carbon bonds.

In certain embodiments, a coalescent has the formula:

$$R^1\text{—}(C(O)\text{—}X\text{—}O)_n\text{—}R^2$$

wherein: $R^1$ is an organic group having at least 3 and less than 100 carbon atoms, wherein the organic group is an aliphatic group, alicyclic group, heterocyclic group, or combinations thereof; X is a divalent organic group including an oxygen atom; n is 1 to 10; and $R^2$ is an organic group having less than 100 carbon atoms and includes one carbonyl group; with the proviso that the coalescent does not include any aliphatic unsaturated carbon-carbon bonds.

In certain embodiments, a coalescent has the formula:

$$R^1\text{—}(C(O)\text{—}X\text{—}O)_n\text{—}R^2$$

wherein: $R^1$ is an aliphatic hydrocarbyl moiety and comprises 3 to 24 carbon atoms, X is a divalent organic group including oxygen atoms and 2 to 8 carbon atoms, n is 1, and $R^2$ is an organic group including 3 to 24 carbon atoms and one carbonyl group; with the proviso that the coalescent does not include any aliphatic unsaturated carbon-carbon bonds.

In certain embodiments, a coalescent has the formula:

$$R^1\text{—}(C(O)\text{—}X_r\text{—}O)_n\text{—}R^2$$

wherein: $R^1$ is a hydrocarbyl moiety having 3 to 24 carbon atoms, wherein the hydrocarbyl moiety is an aliphatic moiety, alicyclic moiety, heterocyclic moiety, or combinations thereof; X is a divalent organic group having 2 to 8 carbon atoms; r is 1; n is 1; and $R^2$ is an organic group having less than 100 carbon atoms and includes a carbonyl group; with the proviso that $R^1$ and $R^2$ together do not include any aliphatic unsaturated carbon-carbon bonds.

In certain embodiments, a coalescent has the formula:

$$R^1\text{—}(C(O)\text{—}X\text{—}O)_n\text{—}H$$

wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10.

In certain embodiments, a coalescent has the formula:

$$R^1\text{—}(C(O)\text{—}X\text{—}O)\text{—}R^2$$

wherein: $R^1$ comprises an aromatic group having at least 3 and less than 100 carbon atoms; X is a divalent organic group comprising one or more nonperoxidic oxygen atoms; $R^2$ comprises an aromatic group having at least 3 and less than 100 carbon atoms; with the proviso that $R^1$ and $R^2$ together do not include any aliphatic unsaturated carbon-carbon bonds.

Examples of preferred low VOC coalescents include bis(2-ethylhexyl) maleate, bis(2-ethylhexyl) adipate, bis(2-ethylhexyl) azelate, isodecyl benzoate, tri(ethylene glycol)bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid, monoester of propylene glycol.

These compounds can be formed using standard organic synthesis techniques, which are well known to one of skill in the art.

The amount of the one or more low VOC coalescents present in the water-based compositions of the present disclosure includes an amount that provides the desired result. Preferably, one or more relatively low VOC coalescents, are present in a water-based composition in an amount of at least 1 wt-%, or at least 2 wt-%, or at least 3 wt-%, or at least 4 wt-%, or at least 5 wt-%, based on polymer solids. Preferably, one or more relatively low VOC coalescents are present in a water-based composition in an amount of up to 20 wt-%, up to 10 wt-%, based on polymer solids. When mixtures of such coalescents are used, the numerical values of the variables in the formulas described herein are averages.

Polymers

The preferred polymers of the latex-based compositions of the present disclosure include latex or water-dispersible polymers. These are well known in the paint art and are typically particles emulsified or suspended in an aqueous medium.

Suitable polymers are thermoplastic polymers with a relatively high molecular weight (e.g., 50,000 to greater than 1,000,000 Daltons). The polymers can have a wide range of glass transition temperatures, depending on the desired properties of the resultant coating. For example, suitable polymers include those that have at least one Tg within a range of −20° C. to 70° C., or −20° C. to 60° C., or −10° C. to 30° C.

A variety of latex polymers may be employed in the disclosed compositions including (meth)acrylics, vinyls, oil-modified polymers, polyesters, polyurethanes, polyamides, chlorinated polyolefins, and mixtures or copolymers thereof. Latex polymers are readily synthesized at modest cost, and are typically prepared through chain-growth polymerization, using one or more ethylenically unsaturated compounds (preferably monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide, dimethylaminomethacrylate, diethylaminomethacrylate, N-hydroxy(meth)acrylamide, vinyl ether maleate, vinyl esters of VERSATIC acid (VERSATIC acid is a synthetic saturated monocarboxylic acid of highly branched structure containing about 5 to about 10 carbon atoms), and mixtures thereof.

In certain embodiments, latex polymers include, for example, the polymerization products of ethylenically unsaturated monomers, such as alkyl and alkoxy acrylates or methacrylates, vinyl esters of saturated carboxylic acids, monoolefins, conjugated dienes, optionally with one or more monomers, such as, for example, styrene, methyl methacrylate, butyl acrylate, 2-ethylhexyl acrylate, vinyl acetate, acrylonitrile, and vinyl chloride.

In certain embodiments, the latex polymer particles include a homopolymer or copolymer including at least one of an acrylate or a methacrylate.

Exemplary commercially available latex polymers include AIRFLEX EF811 (available from Air Products), EPS 2533, EPS 2757, EPS 2792, EPS 2705(available from EPS/CCA) and NEOCAR 2300, NEOCAR 820 and NEOCAR 2535 (Neocars are now Arkema), RHOPLEX VSR 50, RHOPLEX VSR 2015, (available from Dow Chemical Co.), Optive 130 and OPTIVE 230 from BASF. Other exemplary latex polymers include the latex polymers described in U.S. patent application No. US 2007/0110981 A1.

Surfactants suitable for use with latex polymers include, for example, sodium lauryl sulfate, sodium laureth sulfate (DISPONIL series from BASF), sodium dodecyl benzene sulfonate, RHODAFAC RE 610, RHODAFAC RS 410, RHODAFAC RS 610, RHODAFAC RS 710, ABEX EP 100, ABEX EP 110 (Rhodia/Solvay), POLYSTEP B1, POLYSTEP B330 (Stepan, Northfield, ILL.), sodium dioctyl sulfosuccinate, and the like.

Suitable water-dispersible polymers include polyurethanes, epoxies, polyamides, chlorinated polyolefins, acrylics, oil-modified polymers, polyesters, and mixtures or copolymers thereof, for example. Such polymers are readily synthesized and made to be water dispersible using conventional techniques. For example, the incorporation of amine or acid functionality produces water dispersibility.

Oil-modified polymers can also be used if desired. Such polymers are readily synthesized and can be made to be water-dispersible using conventional techniques. As used herein, oil-modified polymers are broadly defined to include polymers that contain oils and/or oil based derivatives such as glyceride oils (monoglycerides, diglycerides, and the like), fatty acids, fatty amines, and mixtures thereof. Examples of such oil-modified polymers include, alkyds, oil-modified polyurethanes, oil-modified epoxies, oil-modified polyamides, oil-modified acrylics, and mixtures or copolymers thereof. Preferably, the oil-modified polymer is an oil-modified polyurethane or an alkyd.

Suitable polymers also include multi-stage latexes (i.e., those with more than one Tg). In such polymers, generally, there is a hard and a soft phase so the Tg peaks could be −30° and +100° in the same polymer mixture. Frequently these polymers are referred to as core-shell, but could also be other morphologies like "raspberry-like" or "acorn-like."

Suitable polymers also include "gradient" polymers in which there is a water-based changing composition (or Tg) during polymerization. Often these types of polymers will not exhibit a sharp inflection point corresponding to a Tg when measured by DSC.

The amount of the latex or water-dispersible polymers present in the coating compositions of the present disclosure includes an amount that provides the desired result. Preferably, one or more polymers is used in an amount of at least 10 wt-%, based on 10-25% solids of the paint for flats and 15-35% for semi-gloss paints. Preferably, one or more polymers is present in an amount of up to 25 wt-%, based on solids.

The amount of the polymers is dependent upon the type of product, and if a paint, the finish of the paint. For example, a flat paint may have a lower percentage of polymer than satin or semi-gloss sheens, in general.

Optional Additives

Other components of the coating compositions of the present disclosure include those typically used in paint formulations, such as pigments (in a pigment grind), fillers, thickeners, biocides, mildewcides, surfactants, dispersants, defoamers, and the like. The coating compositions can be made using standard techniques known in the paint industry. Typical PVC (pigment volume concentrations) ranges for flat paints are 35-75 and for semi gloss are 20-40.

The types of additives that can be incorporated into a water-based composition of the present disclosure depends on the use of the composition. For example, a paint includes one or more pigments (referred to as a pigment grind). A sealer typically may just include a defoamer and possibly a surfactant. A caulk or sealant includes similar additives to that of a paint.

In certain embodiments, a paint contains sufficient $TiO_2$ pigment to be substantially visually opaque when applied at a thickness of 3 mils (0.0762 mm) and dried.

Methods of Addition

The UV absorber(s) can be incorporated into the compositions by first dissolving it in one or more low VOC coalescents in which it is soluble, and mixing the resulting solution either with the pigment premix (i.e., pigment grind) and/or the polymer particles, or completed pigment/polymer mixture. Preferably, it is added to the pigment premix or the polymer particles. More preferably, it is added to the polymer particles.

Thus, herein the water-based compositions can be prepared by a method that includes: providing an aqueous polymer comprising a latex or water-dispersible polymer in water; providing an additive package comprising at least one of a pigment, a thickener, a mildewcide, a biocide, a defoamer, a surfactant, a dispersant, a filler, and combinations thereof; providing one or more water-insoluble ultraviolet absorbers capable of absorbing UV radiation within a range of 240-400 nm; providing one or more low VOC coalescents having a volatile organic content of 30% or less; dissolving the one or more water-insoluble ultraviolet absorbers in the one or more low VOC coalescents to form a UV-absorber-coalescent solution; mixing the aqueous polymer with the additive package; and before or after mixing the aqueous polymer with the additive package, the UV-absorber-coalescent solution is mixed with the aqueous polymer, the additive package, or both to form a water-based coating.

That is, the UV-absorber-coalescent solution can be mixed with the aqueous polymer, or with the additive package, or with both before mixing the aqueous polymer with the additive package together. Alternatively, the aqueous polymer and additive package can be mixed together and then the UV-absorber-coalescent solution can be added to it.

A preferred method involves mixing the UV-absorber-coalescent solution with the aqueous polymer, and subsequently mixing the aqueous polymer (having the UV-absorber-coalescent therein) with the additive package.

ILLUSTRATIVE EMBODIMENTS

1. A method of preparing a water-based composition, the method comprising:
   providing an aqueous polymer comprising a latex or water-dispersible polymer in water;
   providing an additive package comprising at least one of a pigment, a thickener, a mildewcide, a biocide, a defoamer, a surfactant, a dispersant, a filler, and combinations thereof;
   providing one or more water-insoluble ultraviolet absorbers capable of absorbing UV radiation within a range of 240-400 nm;
   providing one or more low VOC coalescents having a volatile organic content of 30% or less;
   dissolving the one or more water-insoluble ultraviolet absorbers in the one or more low VOC coalescents to form a UV-absorber-coalescent solution;
   mixing the aqueous polymer with the additive package; and
   before and/or after mixing the aqueous polymer with the additive package, the UV-absorber-coalescent solution is mixed with the aqueous polymer, the additive package, or both to form a water-based coating.
2. The method of embodiment 1 wherein mixing the UV-absorber-coalescent solution with the aqueous polymer, additive package, or both occurs before mixing the aqueous polymer with the additive package.
3. The method of embodiment 1 wherein the method comprises mixing the UV-absorber-coalescent solution with the aqueous polymer, and subsequently mixing the aqueous polymer having the UV-absorber-coalescent therein with the additive package.
4. The method of any of embodiments 1 through 3 wherein the water-based composition comprises a sufficient amount of the one or more coalescents to facilitate coalescence of the aqueous polymer.
5. The method of any of embodiments 1 through 4 wherein the water-based composition comprises a sufficient amount of the one or more water-insoluble ultraviolet absorbers to improve dirt pick-up resistance of the water-based composition by at least 10%, relative to the same water-based composition without the ultraviolet absorber, based on a change in ΔE values.
6. The method of embodiment 5 wherein the water-based composition comprises a sufficient amount of the one or more water-insoluble ultraviolet absorbers to improve dirt pick-up resistance by at least 50%, relative to the same water-based composition without the ultraviolet absorber, based on a change in ΔE values.
7. The method of any of embodiments 1 through 6 wherein the water-based composition comprises at least 0.1 wt-% of the one or more ultraviolet absorbers, based on the weight of the polymer solids.
8. The method of any of embodiments 1 through 7 wherein the water-based composition comprises up to 5.0 wt-% of the one or more ultraviolet absorbers, based on the weight of the polymer solids.
9. The method of any of embodiments 1 through 8 wherein the one or more water-insoluble photoinitators are capable of absorbing UV radiation within a range of 315-375 nm.
10. The method of any of embodiments 1 through 9 wherein the one or more water-insoluble photoinitators is selected from the group of benzophenone, polymeric benzophenone, phenylbis(2,4,6-trimethylbenzoyl)phosphine oxide, ethyl-2,4,6-trimethylbenzoylphenylphosphinate, 2,4,6-trimethylbenzophenone, 4-methylbenzophenone, 2,2-dimethoxy-1,2-diphenylethanone, 1-hydroxycyclohexyl phenyl ketone, 2-hydroxy-2-methyl-1-phenyl-1-propanone, isopropylthioxanthone, methyl-o-benzoyl-benzoate, methylbenzoylformate, benzoin ethyl ether, 4'-ethoxyacetophenone, and combinations thereof.
11. The method of embodiment 10 wherein the one or more water-insoluble photoinitators is benzophenone.
12. The method of any of embodiments 1 through 11 wherein the water-based composition is a paint, a sealer (pigmented or unpigmented), a caulk, or a sealant.
13. The method of embodiment 12 wherein the water-based composition is a coating composition.
14. The method of any of embodiments 1 through 13 wherein the additive package comprises a pigment grind.
15. The method of embodiment 14 wherein the water-based composition is in the form of a paint having one or more additives selected from the group consisting of pigments, fillers, thickeners, biocides, mildewcides, surfactants, dispersants, and defoamers.
16. The method of any of embodiments 1 through 15 wherein the aqueous polymer comprises a latex polymer having at least one Tg within a range of −20° C. to 70° C.
17. The method of embodiment 15 wherein the latex polymer has at least one Tg within a range of −20° C. to 60° C.
18. The method of embodiment 17 wherein the latex polymer has at least one Tg within a range of −10° C. to 30° C.
19. The method of any of embodiments 1 through 18 wherein the aqueous polymer comprises a multi-stage latex polymer having at least two Tg peaks or a gradient polymer of gradually changing composition.
20. The method of any of embodiments 16 through 19 wherein the latex polymer comprises the polymerization product of ethylenically unsaturated monomers selected from the group of alkyl acrylates, alkoxy acrylates, alkyl methacrylates, alkoxy methacrylates, vinyl esters of saturated carboxylic acids, monoolefins, conjugated diener, styrene, and vinyl chloride.
21. The method of embodiment 20 wherein the latex polymer comprises a surfactant and polymer particles comprising a homopolymer or copolymer including at least one of an acrylate or a methacrylate.
22. The method of any of embodiments 1 through 21 wherein the one or more coalescents do not phase separate from the water-based composition upon standing at 49° C. for four weeks.
23. The method of any of embodiments 1 through 22 wherein the one or more coalescents are present in a sufficient amount to facilitate the formation of a polymer film of a latex polymer at a temperature of less than 25° C.
24. The method of embodiment 23 wherein the one or more coalescents are selected to facilitate, and used in an amount that facilitates, the formation of a polymer film of a latex polymer at a temperature of 4° C. to 10° C.
25. The method of embodiment 24 wherein the one or more coalescents are selected to facilitate, and used in an amount that facilitates, the formation of a polymer film of a latex polymer at a temperature of 4° C. to 5° C.
26. The method of any of embodiments 1 through 25 wherein the coalescent has a volatile organic content of 20% or less.
27. The method of embodiment 26 wherein the one or more coalescents has a volatile organic content of 15% or less.
28. The method of any of embodiments 1 through 27 wherein the one or more coalescents is nonreactive with the aqueous polymer.
29. The method of any of embodiments 1 through 28 wherein the one or more coalescents is dispersible in the water-based composition to form a uniform mixture.

30. The method of any of embodiments 1 through 29 wherein one or more coalescents, wherein at least one coalescent has the formula:

$$R^1-C(O)-X_r-O)_n-R^2$$

wherein:
R$^1$ is an organic group;
X is a divalent organic group;
r is 0 to 1;
n is 1 to 10; and
R$^2$ is hydrogen or an organic group;
with the proviso that R$^1$ includes at least three carbon atoms when X is not —(CH$_2$)$_s$— wherein s is 2 to 8;
with the proviso that the at least one coalescent has less than two aliphatic unsaturated carbon-carbon bonds when r is zero 31. The method of any of embodiments 1 through 30 wherein the water-based composition comprises at least 1 wt-% of the one or more coalescents, based on polymer solids.

32. The method of embodiment 31 wherein the water-based composition comprises at least 2 wt-% of the one or more coalescents, based on polymer solids.

33. The method of embodiment 32 wherein the water-based composition comprises at least 3 wt-% of the one or more coalescents, based on polymer solids.

34. The method of any of embodiments 29 through 33 wherein:
R$^1$ is an organic group having 3 to 24 carbon atoms;
X is a divalent organic group having 3 to 5 carbon atoms;
r is 1;
n is 1;
R$^2$ is an organic group having less than 100 carbon atoms; and
the coalescent has a number average molecular weight of less than 500.

35. The method of embodiment 34 wherein R$^1$ is an organic group having substituents selected from the group of oxygen atoms, carbonyl groups, hydroxyl groups, and combinations thereof.

36. The method of embodiment 35 wherein R$^1$ is an organic group having 3 to 24 carbon atoms and substituents selected from the group of oxygen atoms, carbonyl groups, hydroxyl groups, and combinations thereof; and wherein R$^2$ is hydrogen.

37. The method of embodiment 36 wherein R$^1$ has the formula R$^3$—(CH$_2$)$_m$—(O(CH$_2$)$_p$)$_q$— wherein R$^3$ is an alkyl or aryl group, m is 0 to 24, p is 1 to 4, and q is 0 to 50.

38. The method of embodiment 37 wherein p is 1 to 2.

39. The method of any of embodiments 34 through 38 wherein X is a divalent organic group having 2 to 8 carbon atoms.

40. The method of embodiment 39 wherein X is an organic group having substituents selected from the group of oxygen atoms, carbonyl groups, and combinations thereof.

41. The method of embodiment 40 wherein X has the formula —(CH$_2$)$_s$—, wherein s is 2 to 8.

42. The method of any of embodiments 1 through 41 wherein at least one coalescent is selected from the group of bis(2-ethylhexyl) maleate, bis(2-ethylhexyl) adipate, bis(2-ethylhexyl) azelate, isodecyl benzoate, tri(ethylene glycol)bis (2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid, monoester of propylene glycol.

43. A method of preparing a water-based composition, the method comprising:
providing an aqueous polymer comprising a latex polymer in water;
providing an additive package comprising at least one of a pigment, a thickener, a mildewcide, a biocide, a defoamer, a surfactant, a dispersant, a filler, and combinations thereof;
providing one or more water-insoluble ultraviolet absorbers capable of absorbing UV radiation within a range of 240-400 nm;
providing one or more low VOC coalescents having a volatile organic content of 30% or less;
dissolving the one or more water-insoluble ultraviolet absorbers in the one or more low VOC coalescents to form a UV-absorber-coalescent solution;
mixing the UV-absorber-coalescent solution with the aqueous polymer; and
subsequently mixing the aqueous polymer having the UV-absorber-coalescent therein with the additive package.

44. The method of embodiment 43 wherein the water-based composition comprises a sufficient amount of the one or more coalescents to facilitate coalescence of the latex polymer.

45. The method of embodiment 43 or 44 wherein the water-based composition comprises a sufficient amount of the one or more water-insoluble ultraviolet absorbers to improve dirt pick-up resistance of the water-based composition by at least 10%, relative to the same water-based composition without the ultraviolet absorber, based on a change in ΔE values.

46. The method of embodiment 45 wherein the water-based composition comprises a sufficient amount of the one or more water-insoluble ultraviolet absorbers to improve dirt pick-up resistance by at least 50%, relative to the same water-based composition without the ultraviolet absorber, based on a change in ΔE values.

47. A water-based composition prepared by a method of any of embodiments 1 through 46.

EXAMPLES

The following examples are offered to aid in understanding of the present disclosure and are not to be construed as limiting the scope thereof. Unless otherwise indicated, all parts and percentages are by weight.

TABLE 1

| UV Absorbers | | | | | |
|---|---|---|---|---|---|
| UV Absorber | Manufacturer | Chemical Name | CAS Number | MW | Absorbance peak (nm) |
| Benzophenone | Aceto | Benzophenone | 119-61-9 | 182 | 250/332 |
| Irgacure 819DW | BASF | Phenylbis(2,4,6-trimethylbenzoyl)phosphine Oxide | 162881-26-7 | 418 | 300/375 |

TABLE 1-continued

UV Absorbers

| UV Absorber | Manufacturer | Chemical Name | CAS Number | MW | Absorbance peak (nm) |
|---|---|---|---|---|---|
| Lucirin TPO-L | BASF | 2,4,6-trimethylbenzoylphenylphosphinic acid ethyl ester | 84434-11-7 | 316 | 375 |
| Esacure TZT | Lamberti | 2,4,6-trimethylbenzophenone & 4-methylbenzophenone | 954-16-5, 134-84-9 | 224, 196 | 250/340 |
| Esacure KB 1 | Lamberti | Benzildimethylketal | 24650-42-8 | 256 | 255/338 |
| Esacure KL 200 | Lamberti | 2-hydroxy-2-methyl-1-phenyl-1-propanone | 7473-98-5 | 164 | 242/328 |
| Ebecryl P39 | Cytec | Polymeric Benzophenone | — | 317 | 195/265 |
| Genocure ITX | Rahn | Isopropylthioxanthone | — | 253 | 259/283 |
| Genocure MBB | Rahn | Methyl-o-benzoyl-benzoate | 606-28-0 | 240 | 246 |
| Genocure MBF | Rahn | Methyl benzoylformate | 15206-55-0 | 164 | 257 |
| BEE | Aldrich | Benzoin ethyl ether | 574-09-4 | 240 | 250 |
| 4-EOA | Aldrich | 4'-Ethoxyacetophenone | 1676-63-7 | 164 | 278 |

These UV Absorbers in Table 1 were pre-screened by incorporating them into a latex polymer without coalescent and compared to benzophenone for dirt pick-up. All showed improvement with respect to no UV absorber, but were not tested further using a low VOC coalescent.

Procedure 1

Preparation of Low VOC Dirt Pick Up Resistance Additive

A sample of 80 grams of Preparation A-G (tributyl citrate or other low VOC coalescent, as shown in Table 2) and 20 g benzophenone were added to an 8 ounce glass jar with screw top. The jars were placed a 60° C. oven for 1 hour, removed, and shaken or mechanically stirred. The jars were returned to the oven for 1 hour and the process was repeated until all the benzophenone was dissolved.

TABLE 2

UV-absorber-coalescent solutions

| Preparation | Coalescent Name | Coalescent Description | Amount Coalescent | Benzophenone |
|---|---|---|---|---|
| A | Tributyl Citrate | Tributyl citrate | 80 g | 20 g |
| B | EDENOL EFC 100 | Oleic acid, monoester with propylene glycol | 80 g | 20 g |
| C | Dioctyl Maleate | Bis 2-ethylhexyl maleate | 80 g | 20 g |
| D | OPTIFILM 400 | Proprietary | 80 g | 20 g |
| E | VELATE 375 | Benzoate Esters | 80 g | 20 g |
| F | BENZOFLEX 50 | Diethyleneglycol and Dipropyleneglycol Dibenzoates | 80 g | 20 g |
| G | Tributyl Citrate | Tributyl Citrate | 100 g | 0 g |

Procedure 2

Paint Making Procedure

A pigment grind was prepared by adding to a grind pot with Cowles dispersing blade, in order, the first 9 ingredients in the paint formula listed in Table 3. The mixture was dispersed at high speed for 20 minutes.

In a second pot, the pigment grind was added to EPS 2792 polymer and the remaining ingredients were added, one at a time. After all other ingredients were added, Preparations A-G were added to the paint. (This is Method 1 Corresponding to Example 1.)

Alternatively, EPS 2792 polymer (Acrylic Latex Polymer, 50% solids) and Preparations A-G (see Table 2 above) were mixed together in a pot for 15 minutes. The pigment grind was added to the letdown pot (with polymer and Preparation A-G). Then the remaining ingredients were added, one at a time, to make the final paint. (This is Method 2 Corresponding to Example 2.)

TABLE 3

Semi Gloss Paint Formulation

| Raw Material | Supplier | Amount |
|---|---|---|
| Water | | 0.83 |
| Tamol 165A | Dow | 6.00 |
| Byk 348 | BYK | 2.0 |
| BYK 28 | BYK | 1.0 |
| Nuosept 498 | Ashland | 3.00 |
| Acrysol RM-2020NPR | Dow | 5.0 |
| Attagel 50 | BASF | 3.00 |
| Minex 10 | World Minerals | 20.00 |
| Kronos 4311 | Kronos | 326.00 |
| EPS 2792 | EPS | 448.00 |
| Water | | 199.17 |
| BYK 28 | BYK | 2.00 |

TABLE 3-continued

Semi Gloss Paint Formulation

| Raw Material | Supplier | Amount |
| --- | --- | --- |
| ammonium hydroxide | | 1.0 |
| Acrysol RM2020NPR | Dow | 10.00 |
| Acrysol RM-8W | Dow | 7.00 |
| Preparation A-G | EPS | 10.20 |
| Total | | 1064.20 |

Procedure 3

Lab Dirt Pick-Up Test Procedure

A sample of the paint to be tested was applied to a 3×6 aluminum Q panel (or other appropriate substrate) using a wire wound drawdown bar (RDS) to a film thickness of about 3 mils Each paint sample was dried for 24 hours at room temperature (70-75° F.). Then, each panel was placed outdoors or in a QUVA cabinet for 1 week, with some exposure to sunlight. Outdoor testing was preferred, but QUVA exposure is acceptable.

The panels were returned to the lab after 1 week exposure and blotted dry if necessary.

A "dirt" slurry was prepared as follows. First, 50 grams (g) red iron oxide (R4097), 40 g yellow iron oxide pigment, and 10 g black iron oxide pigment were combined and hand stirred or shaken until homogenous. Then, 0.5 g TAMOL 731 (dispersant available from Dow Chemical) was added to 200 g deionized water with agitation. The pigment combination was slowly added and mixed for 30 minutes until a smooth slurry has formed.

The slurry was applied to half of the coated panels using a foam applicator or other suitable brush, and dried on panels at room temperature for 3-4 hours.

The dried slurry was washed off each panel by running the panel under water and using a small piece of cheesecloth, rubbing lightly. A clean cloth was used for each panel. The panels were blotted dry and allowed to completely dry (2-4 hours) before measuring change in color, ΔE, using a spectrophotometer.

Procedure 4

Dirt Pick-Up Testing

The dirt pick-up resistance was evaluated using the Lab Dirt Pick-Up Test Procedure described above. Aluminum panels were prepared in duplicate and results are averaged.

The results are reported as a change in color, ΔE, reading from a spectrophotometer, in Tables 4 and 5.

Example 1

Paints Prepared Using Semi Gloss Formulation and Method 1

A pigment grind was prepared by adding to a grind pot with Cowles dispersing blade, in order, the first 9 ingredients in the paint formula listed in Table 3. The mixture was dispersed at high speed for 20 minutes.

In a second pot, the pigment grind was added to EPS 2792 polymer and the remaining ingredients were added, one at a time. After all other ingredients were added, Preparations A-G (From Table 2) were added to the paint.

These samples were tested using Procedures 3 and 4 and the results reported in Table 4.

TABLE 4

| | ΔE (Change in ΔE) |
| --- | --- |
| A | 23.89 (−2.89) |
| B | 28.82 (+2.04) |
| C | 26.05 (−0.73) |
| D | 25.56 (−1.22) |
| E | 24.01 (−2.77) |
| F | 24.99 (−1.79) |
| G | 26.78 (control)* |

*Control paint has no ultraviolet absorber, only coalescent.

Example 2

Paints Prepared Using Semi Gloss Formulation and Method 2

A pigment grind was prepared by adding to a grind pot with Cowles dispersing blade, in order, the first 9 ingredients in the paint formula listed in Table 3. The mixture was dispersed at high speed for 20 minutes.

EPS 2792 polymer (Acrylic Latex Polymer, 50% solids) and Preparations A-G (see Table 2 above) were mixed together in a pot for 15 minutes. The pigment grind was added to the letdown pot (with polymer and Preparation A-G). Then the remaining ingredients were added, one at a time, to make the final paint.

These samples were tested using Procedures 3 and 4 and the results reported in Table 5.

TABLE 5

| | ΔE (change in ΔE) |
| --- | --- |
| A | 7.68 (−18.53) |
| B | 12.96 (−13.25) |
| C | 7.37 (−18.84) |
| D | 7.52 (−18.69) |
| E | 10.83 (−15.38) |
| F | 10.17 (−16.04) |
| G | 26.21 (control) |

What is claimed is:

1. A method of preparing a water-based composition, the method comprising:
   providing an aqueous polymer comprising a latex or water-dispersible polymer in water;
   providing an additive package comprising at least one of a pigment, a thickener, a mildewcide, a biocide, a defoamer, a surfactant, a dispersant, a filler, and combinations thereof;
   providing one or more water-insoluble ultraviolet absorbers capable of absorbing UV radiation within a range of 240-400 nm;
   providing one or more low VOC coalescents having a volatile organic content of 30% or less;
   dissolving the one or more water-insoluble ultraviolet absorbers in the one or more low VOC coalescents to form a UV-absorber-coalescent solution;
   mixing the aqueous polymer with the additive package; and
   before and/or after mixing the aqueous polymer with the additive package, the UV-absorber-coalescent solution is mixed with the aqueous polymer, the additive package, or both to form a water-based coating.

2. The method of claim 1 wherein mixing the UV-absorber-coalescent solution with the aqueous polymer, additive package, or both occurs before mixing the aqueous polymer with the additive package.

3. The method of claim 1 wherein the method comprises mixing the UV-absorber-coalescent solution with the aqueous polymer, and subsequently mixing the aqueous polymer having the UV-absorber-coalescent therein with the additive package.

4. The method of claim 1 wherein the water-based composition comprises an amount of the one or more coalescents effective to facilitate coalescence of the aqueous polymer.

5. The method of claim 1 wherein the water-based composition comprises an amount of the one or more water-insoluble ultraviolet absorbers effective to improve dirt pick-up resistance of the water-based composition by at least 10%, relative to the same water-based composition without the ultraviolet absorber, based on a change in ΔE values.

6. The method of claim 5 wherein the water-based composition comprises an amount of the one or more water-insoluble ultraviolet absorbers effective to improve dirt pick-up resistance by at least 50%, relative to the same water-based composition without the ultraviolet absorber, based on a change in ΔE values.

7. The method of claim 1 wherein the water-based composition comprises at least 0.1 wt-% of the one or more ultraviolet absorbers, based on the weight of the polymer solids.

8. The method of claim 1 wherein the water-based composition comprises up to 5.0 wt-% of the one or more ultraviolet absorbers, based on the weight of the polymer solids.

9. The method of claim 1 wherein the one or more water-insoluble ultraviolet absorbers are capable of absorbing UV radiation within a range of 315-375 nm.

10. The method of claim 1 wherein the one or more water-insoluble ultraviolet absorbers is selected from the group of benzophenone, polymeric benzophenone, phenylbis(2,4,6-trimethylbenzoyl)phosphine oxide, ethyl-2,4,6-trimethylbenzoylphenylphosphinate, 2,4,6-trimethylbenzophenone, 4-methylbenzophenone, 2,2-dimethoxy-1,2-diphenylethanone, 1-hydroxycyclohexyl phenyl ketone, 2-hydroxy-2-methyl-1-phenyl-1-propanone, isopropylthioxanthone, methyl-o-benzoyl-benzoate, methylbenzoylformate, benzoin ethyl ether, 4'-ethoxyacetophenone, and combinations thereof.

11. The method of claim 10 wherein the one or more water-insoluble photoinitators is benzophenone.

12. The method of claim 1 wherein the water-based composition is a paint, a sealer, a caulk, or a sealant.

13. The method of claim 1 wherein the aqueous polymer comprises a latex polymer having at least one Tg within a range of −20° C. to 70° C.

14. The method of claim 13 wherein the latex polymer comprises the polymerization product of ethylenically unsaturated monomers selected from the group of alkyl acrylates, alkoxy acrylates, alkyl methacrylates, alkoxy methacrylates, vinyl esters of saturated carboxylic acids, monoolefins, conjugated dienes, styrene, and vinyl chloride.

15. The method of claim 14 wherein the latex polymer comprises a surfactant and polymer particles comprising a homopolymer or copolymer including at least one of an acrylate or a methacrylate.

16. The method of claim 1 wherein the one or more coalescents are present in an amount effective to facilitate the formation of a polymer film of a latex polymer at a temperature of less than 25° C.

17. The method of claim 1 wherein the one or more coalescents has a volatile organic content of 15% or less.

18. The method of claim 1 wherein at least one coalescent is selected from the group of bis(2-ethylhexyl) maleate, bis(2-ethylhexyl) adipate, bis(2-ethylhexyl) azelate, isodecyl benzoate, tri(ethylene glycol)bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid, monoester of propylene glycol.

19. A method of preparing a water-based composition, the method comprising:
providing an aqueous polymer comprising a latex polymer in water;
providing an additive package comprising at least one of a pigment, a thickener, a mildewcide, a biocide, a defoamer, a surfactant, a dispersant, a filler, and combinations thereof;
providing one or more water-insoluble ultraviolet absorbers capable of absorbing UV radiation within a range of 240-400 nm;
providing one or more low VOC coalescents having a volatile organic content of 30% or less;
dissolving the one or more water-insoluble ultraviolet absorbers in the one or more low VOC coalescents to form a UV-absorber-coalescent solution;
mixing the UV-absorber-coalescent solution with the aqueous polymer; and
subsequently mixing the aqueous polymer having the UV-absorber-coalescent therein with the additive package.

20. A water-based composition prepared by a method of claim 1 or claim 19.

* * * * *